(No Model.)
M. F. WILLIAMS.
CORKSCREW.
No. 305,258. Patented Sept. 16, 1884.
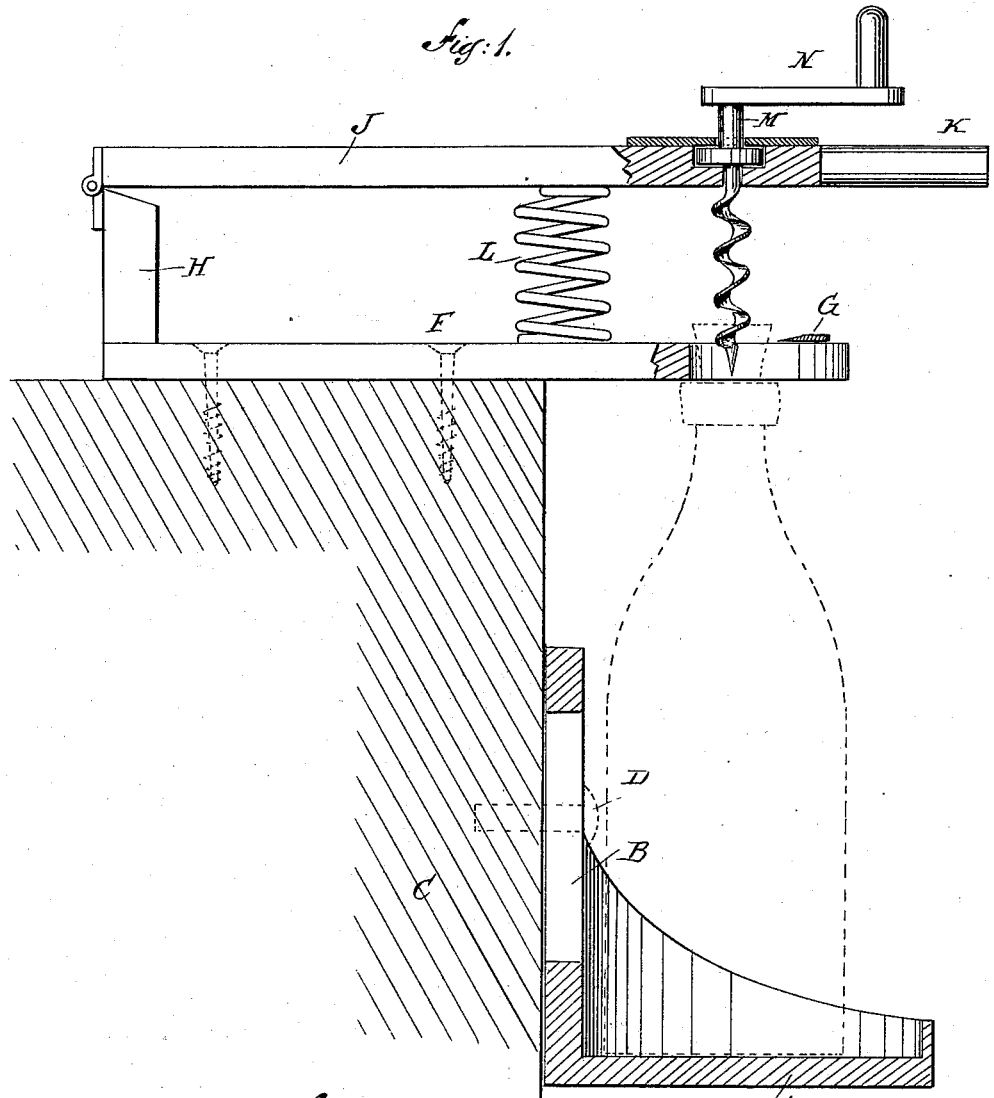
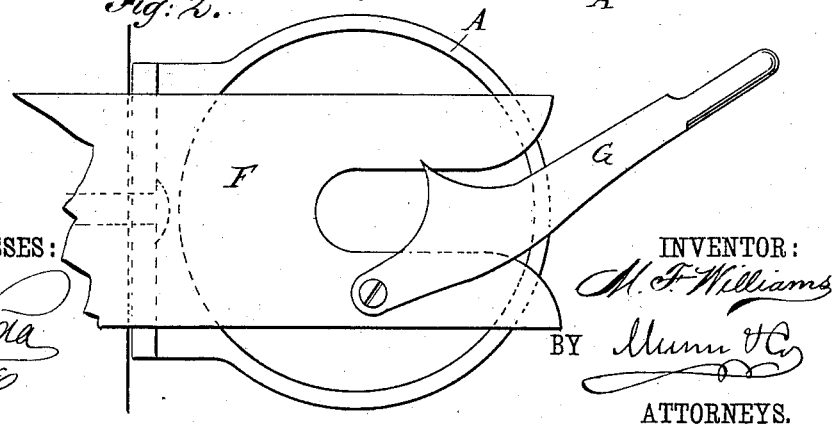
WITNESSES:
INVENTOR:
M. F. Williams
BY Munn & Co.
ATTORNEYS.

UNITED STATES PATENT OFFICE.

MARTIN F. WILLIAMS, OF BASTROP, LOUISIANA.

CORKSCREW.

SPECIFICATION forming part of Letters Patent No. 305,258, dated September 16, 1884.

Application filed July 23, 1884. (No model.)

*To all whom it may concern:*

Be it known that I, MARTIN F. WILLIAMS, of Bastrop, in the parish of Morehouse and State of Louisiana, have invented a new and Improved Corkscrew, of which the following is a full, clear, and exact description.

The object of my invention is to provide a new and improved device for holding bottles while uncorking them, and also to facilitate the uncorking of the bottle.

The invention consists in the combination, with a bottle-support, of a bar projecting over the same and a pivoted lever over the bar, in the free end of which lever a corkscrew is held to turn. A spring is interposed between the bar and the lever, and the said spring forces the lever upward after the corkscrew has been screwed into the cork, and thereby the cork is pulled out of the bottle.

Reference is to be had to the accompanying drawings, forming part of this specification, in which similar letters of reference indicate corresponding parts in both the figures.

Figure 1 is a longitudinal elevation of my improved corkscrew, parts being broken out and others shown in section. Fig. 2 is a plan view of the same, parts being broken out.

A cup-shaped bracket, A, provided with a vertical slot, B, is held to a counter, C, by a screw, D, passed through the slot, and thus permitting of raising the cup-shaped bracket higher or lower. A forked bar or plate, F, is secured to the top of the counter, &c., in such a manner that the forked end projects over the cup-shaped bracket and over a bottle placed on the said bracket. On the forked end of the bar or plate F a knife, G, is pivoted, which is used for cutting the wires, cords, &c., that hold the cork in the bottle. A standard or upright, H, is arranged at the inner end of the bar or plate F, and to the upper end of this standard or upright a lever, J, is pivoted, which is provided with a handle, K, on its free end. A powerful spring, L, arranged between the bar F and the lever J, presses the latter upward. A corkscrew, M, having a crank-handle, N, is held to revolve in the free end of the lever J, directly above the forked part of the bar F, but must not move up and down independently of the lever J.

The operation is as follows: The bottle to be uncorked is placed on the bracket A, and the corkscrew M is screwed into the cork in the bottle, thereby drawing the lever J downward and compressing the spring L. When the spring is compressed more or less, it can overcome the friction by which the cork is held in the bottle and pulls the cork out.

Having thus described my invention, what I claim as new, and desire to secure by Letters Patent, is—

1. The combination, with a bracket adapted to hold a bottle, of a lever projecting over the bracket and a corkscrew held to turn in the said lever, substantially as herein shown and described.

2. The combination, with a vertically-adjustable bracket adapted to hold a bottle, of a lever projecting over the bracket and a corkscrew held to turn in the lever, substantially as herein shown and described.

3. The combination, with a bottle-support, of a lever projecting over the same and a corkscrew held to turn in the lever, substantially as herein shown and described.

4. The combination, with a bottle-support and a bar projecting over the same, of a pivoted lever over the bar, a corkscrew held to turn in the free end of the lever, and a spring interposed between the bar and the lever, substantially as herein shown and described.

5. The combination, with a bottle-support, of a bar projecting over the same, a pivoted lever over the bar, a corkscrew in the free end of the lever, and a knife on the projecting end of the bar, substantially as herein shown and described.

6. The combination, with the bottle-support A, of the bar F, having one end forked, the blade or knife G, pivoted on the forked part of the bar, the standard H, the lever J, pivoted to the same, the corkscrew M in the lever J, and the spring L, interposed between the bar F and lever J, substantially as herein shown and described.

MARTIN F. WILLIAMS.

Witnesses:
SAM EVANS,
J. L. BUATT.